United States Patent [19]
Phak

[11] Patent Number: 5,698,843
[45] Date of Patent: Dec. 16, 1997

[54] APPARATUS FOR MEASURING MOTION ERRORS OF FIVE DEGREES OF FREEDOM ALONG GUIDEWAY

[76] Inventor: Hee Jae Phak, Na-404, Kyosu Apt., 244-2, Bongchun-dong, Kwanak-ku, Seoul, Rep. of Korea

[21] Appl. No.: 527,678

[22] Filed: Sep. 12, 1995

[51] Int. Cl.[6] ................................................. H01J 40/14
[52] U.S. Cl. ............................... 250/206.2; 250/559.29
[58] Field of Search ........................... 250/206.2, 548, 250/559.3, 559.29; 356/375

[56] References Cited

U.S. PATENT DOCUMENTS

| | | | |
|---|---|---|---|
| 4,707,597 | 11/1987 | Schulz-Hennig et al. | 250/206.2 |
| 4,880,308 | 11/1989 | Shirasu | 250/548 |
| 5,345,087 | 9/1994 | Luber et al. | 250/559.29 |
| 5,457,310 | 10/1995 | Fournier | 250/206.2 |

OTHER PUBLICATIONS

Draft Standard, Methods for Performance Evaluation of Computer Numerically Controlled Machining Centers, ANSI/ASME B5. 54–1991, p. 101, 1991.

Manfred Weck, Handbook of Machine Tools, Metrological Analysis and Performance Tests, vol. 4, 1994, p. 32, translated by H. Bibring.

*Primary Examiner*—Edward P. Westin
*Assistant Examiner*—Kevin Pyo
*Attorney, Agent, or Firm*—Lowe, Price, LeBlanc & Becker

[57] ABSTRACT

A computer aided error measurement system is disclosed. The horizontal and vertical straightness errors as well as roll, pitch and yaw errors are measured simultaneously with just one setup according to the system. The system includes a computer and related components thereof. The system also includes a light source, two beam splitters, and three photodetectors. The output signals are inputted into the computer via amplifying circuits and an analog to digital converter. The computer actuates a motor driver to drive a stepping motor and controls a feed axis with the motion errors. The whole measurement takes are performed in very short time and in real time.

6 Claims, 7 Drawing Sheets

APPARATUS FOR MEASURING MOTION ERRORS OF FIVE DEGREES OF FREEDOM ALONG GUIDEWAY

FIELD OF THE INVENTION

The present invention relates to a coordinate measuring system, and more particularly to an apparatus for measuring motion errors of five degrees of freedom along a guideway of, for example, a machine tool to compensate for position-dependent motion errors in movement along the guideway.

BACKGROUND OF THE INVENTION

Recently, machine tools and multi-axis mechanism require a higher standard precision in line with the development of precision engineering. In particular, in machine tools, robot-related mechanism, automatic feeding systems, electronics and semiconductor-related equipments, and precision machinery industry, machine components thereof, especially feeding components must be designed and fabricated with such an accuracy as coincident with the requisites of corresponding industrial fields. On the other hand, a number of attempts have been made to precisely measure and calculate errors of machine components as designed and fabricated. Accordingly, techniques with high precision and efficiency have been developed to measure and calculate motion errors of machine components.

However, in order to precisely and operatively control positions of the machine components, and to promote accuracy of machine systems, it is very essential to measure and compensate motion errors of machine components produced during movement along a guideway.

Generally, there are multi-degrees of freedom motion errors in sliding motion along a guideway due to machining errors, geometric errors, manufacturing defects, mechanical wear and etc. For a real machine, there are six degrees of freedom which produce errors during movement along a guideway. FIG. 1 shows three linear errors referred to as positional error, horizontal straightness error $H_E$ and vertical straightness error $V_E$, and three rotational errors usually referred to as roll error $R_E$, pitch error $P_E$, and yaw error $Y_E$.

For the purposes of this description, assuming that machine component is moving along a z axis as its guideway, "roll" is defined as rotation of the component about an axis parallel to the z axis;

"pitch" is defined as rotation of the component about an axis parallel to the x axis; and "yaw" is defined as rotation of the component about an axis parallel to the y axis.

Various techniques have been used for the measurement of six motion errors. FIG. 2 and FIG. 3 show well-known apparatus for measuring motion errors along a guideway as prior arts. FIG. 2 is a schematic view illustrating an apparatus for measuring only straightness error. The apparatus shown in FIG. 2 is disclosed in "Draft Standard, Methods for Performance Evaluation of Computer Numerically Controlled Machining Centers" (ANSI/ASME B5. 54-1991, p. 101) which is published in U.S. FIG. 3 is a schematic view illustrating an apparatus for measuring only roll error. The apparatus shown in FIG. 3 is disclosed in "Metrological Analysis and Performance Tests" translated by H. Bibring in Great Britain(Handbook of Machine Tools, Vol.4, 1994, p.32) which is originally published in Germany entitled "Werkzeugmaschinen, Band 1: Maschlnenarten, Bauformen und Anwendungsbereiche" by Manfred Weck.

Referring now to FIG. 2, the light source 11 is slidably positionable on the table 10 which is provided with a plurality of grooves 15. The light source 11 emits beam and the beam is incident on a quadrant photodiode 12 which is mounted on the machine tool spindle 13. Accordingly, sets of horizontal and vertical position coordinates of the beam incident on the quadrant photodiode 12 are only measured. The horizontal straightness error $H_E$ and the vertical straightness error $V_E$ can be measured. However, there is a fatal drawback that three rotational errors, i.e., roll, pitch and yaw errors, $R_E$, $P_E$ and $Y_E$ can never be measured. Further, it takes a lot of time in processing measured data since the data is manually processed, resulting in low precision and decrease of efficiency. Therefore, the prior art has been limitedly used in measuring only straightness errors.

On the other hand, FIG. 3 illustrates another prior art of an error measurement apparatus. As shown in FIG. 3, the apparatus employs two photosensors 24. These photosensors 24 are located on the movable table 23. The movable table 23 is slidably positionable on the fixed table 22 which is provided with a groove 22A.

A laser 20 serves to emit beam and the beam is incident on the beam splitter 21. The beam splitter 21 is adapted to bifurcate the beam into two branches. Two branches of the beam are incident on two photosensors 24, respectively. Accordingly, roll error $R_E$ is calculated by the deviation of the data which is measured by two photosensors 24. However, there is a problem that pitch and yaw errors $R_E$ and $Y_E$ can never be measured. Further, it takes also a lot of time in processing measured data since the data is manually processed.

SUMMARY OF THE INVENTION

It is an object of the present invention to provide an apparatus for measuring five important parametric errors, two vertical and horizontal straightness errors, and three rotational errors, roll, pitch and yaw errors which are measured simultaneously with just one setup.

It is another object of the present invention to provide an apparatus for measuring five important parametric errors in which computer aided on-line measurement techniques are proposed using photosensors and the computer aided features of on-line measurement make the whole measurement tasks performed in very short time.

According to the present invention, these objects and advantages are achieved by means of an apparatus comprising a light source for emitting beam, a device located in front of the light source for splitting the beam into three branches, a photosensing device for receiving the three branches and for sensing positional coordinates of the three branches which are incident thereon, a signal processor connected to the photosensing device to process output signals of the photosensing device, a converter connected to the signal processor to convert analog signals of the signal processor to digital signals, a computer connected to the converter, a driving device controllably connected to the computer to generate a driving force, and a feeding device connected to the driving device for linearly feeding a movable table.

The device for splitting the beam has a first beam splitter and a second beam splitter. The first bean splitter directly receives the beam from the light source and the second beam splitter receives one branch from the first beam splitter. The photosensing device has first, second and third photodetectors which are fixedly mounted on the movable table. Each of the three photodetectors senses each of the three branches.

For a better understanding of the invention, its operating advantages and specific objects attained by its uses, reference is made to the accompanying drawings and descriptive matter in which the preferred embodiments of the invention are illustrated.

DETAILED DESCRIPTION OF THE PREFERRED EMBODIMENTS

This invention will be described in further detail by way of embodiments with reference to the accompanying drawings.

Figure 1:
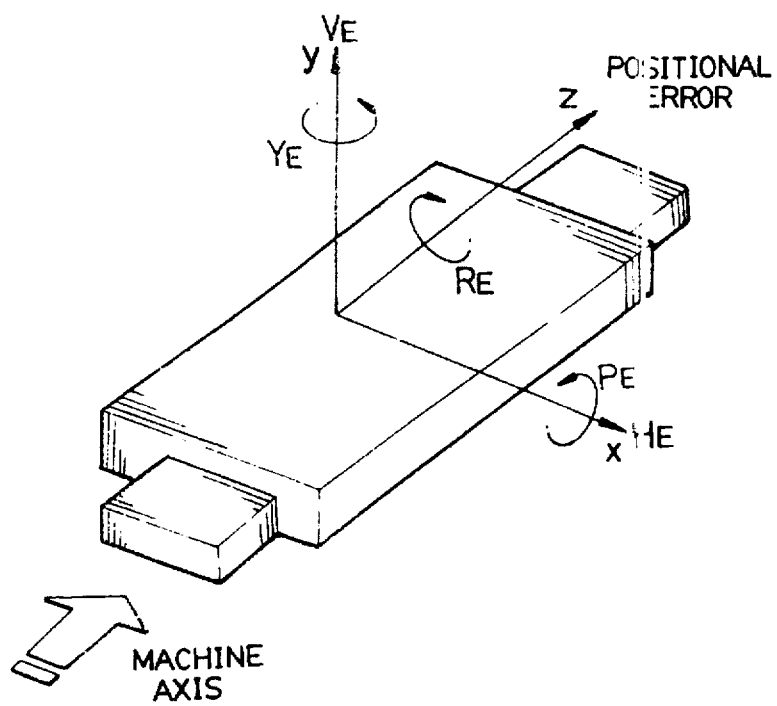
FIG. 1 is a schematic view explaining errors of five degrees of freedom which are measured and calculated by an apparatus according to the present invention.
Figure 2:
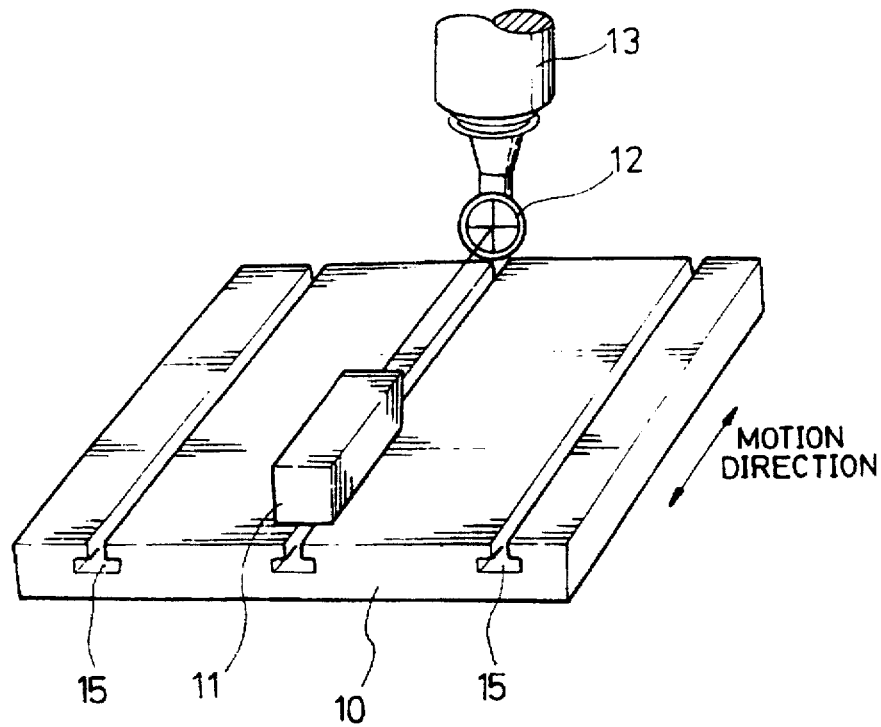
FIG. 2 is a perspective view schematically showing an apparatus according to one prior art which measures only straightness errors.
Figure 3:
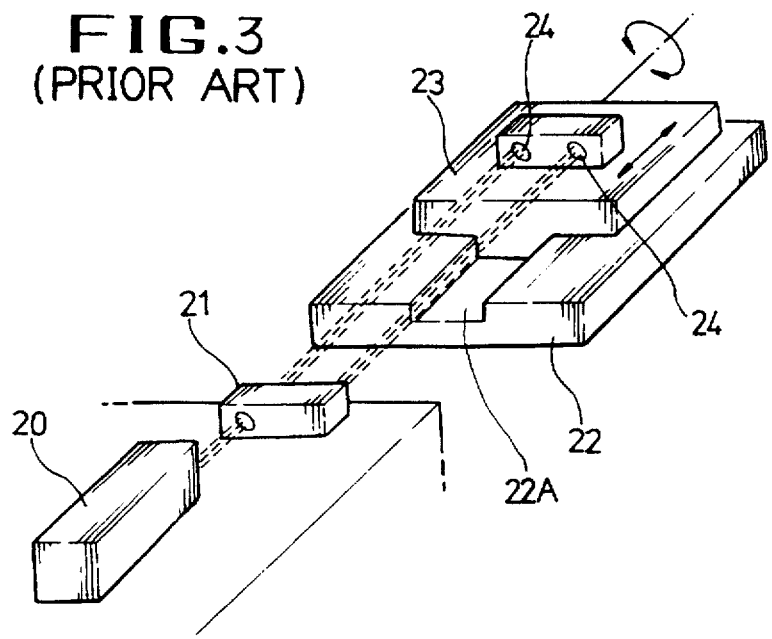
FIG. 3 is a perspective view schematically showing an apparatus according to another prior art which measures only one roll error.
Figure 4:
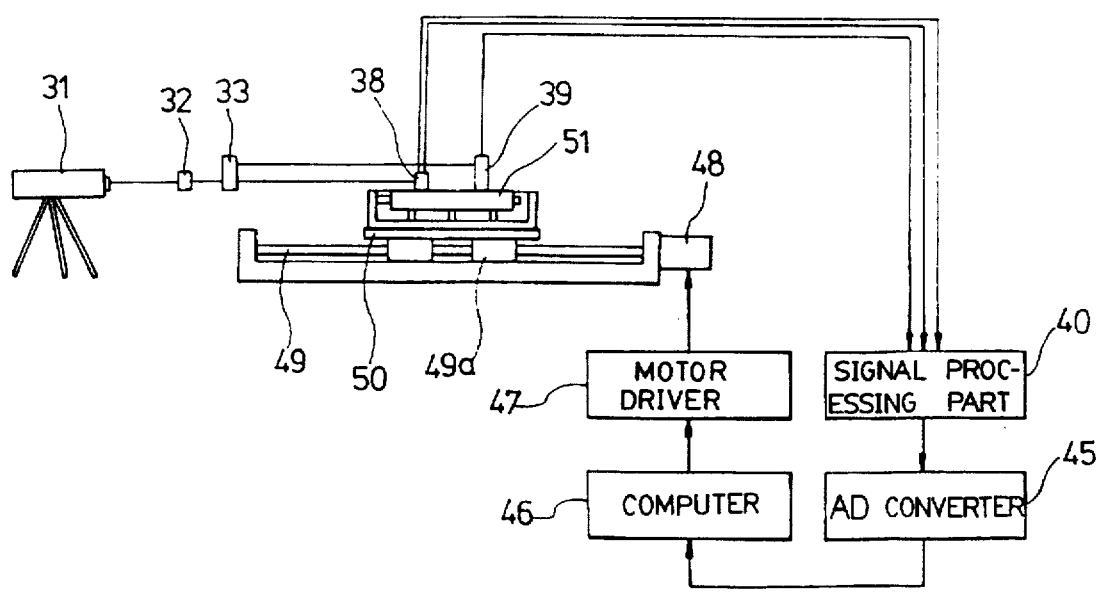
FIG. 4 is a schematic view illustrating an overall constructive system of an apparatus according to the present invention.
Figure 5A:
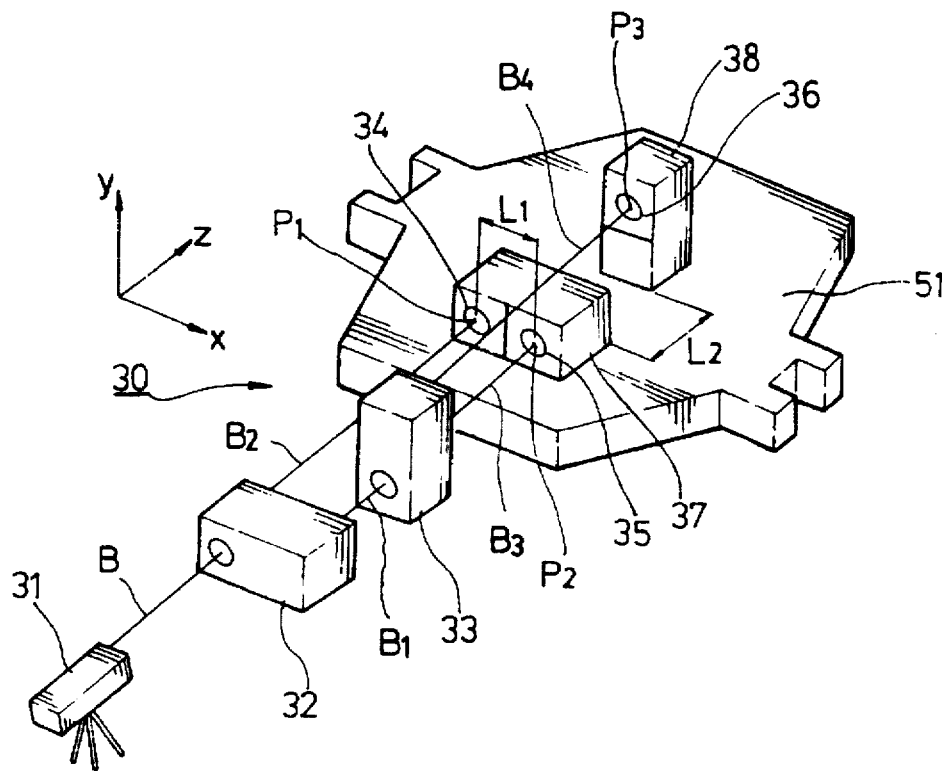
FIG. 5A and FIG. 5B are perspective views illustrating optical parts an apparatus according to the present invention.
Figure 5B:
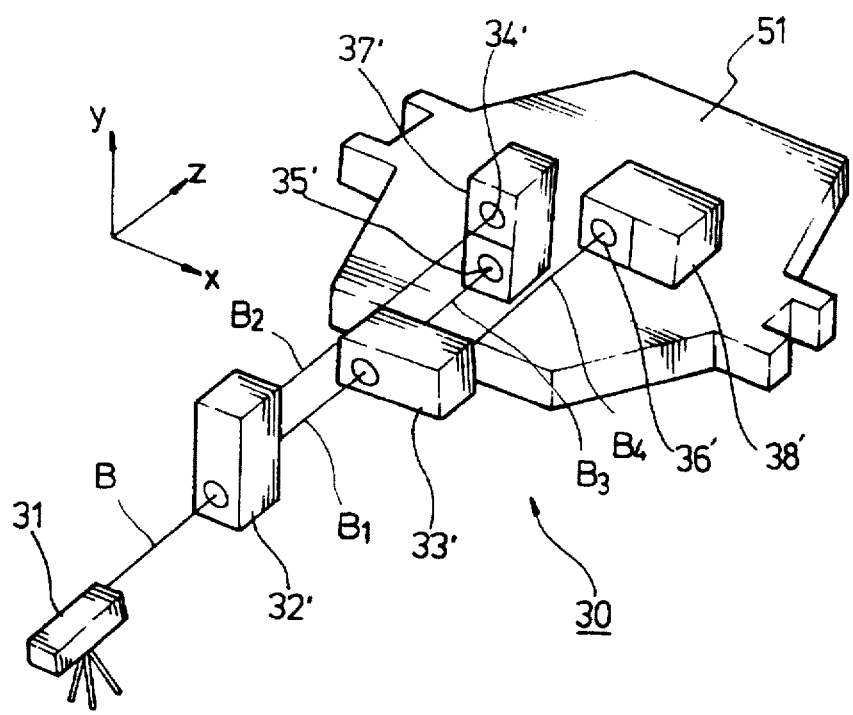
Figure 6:
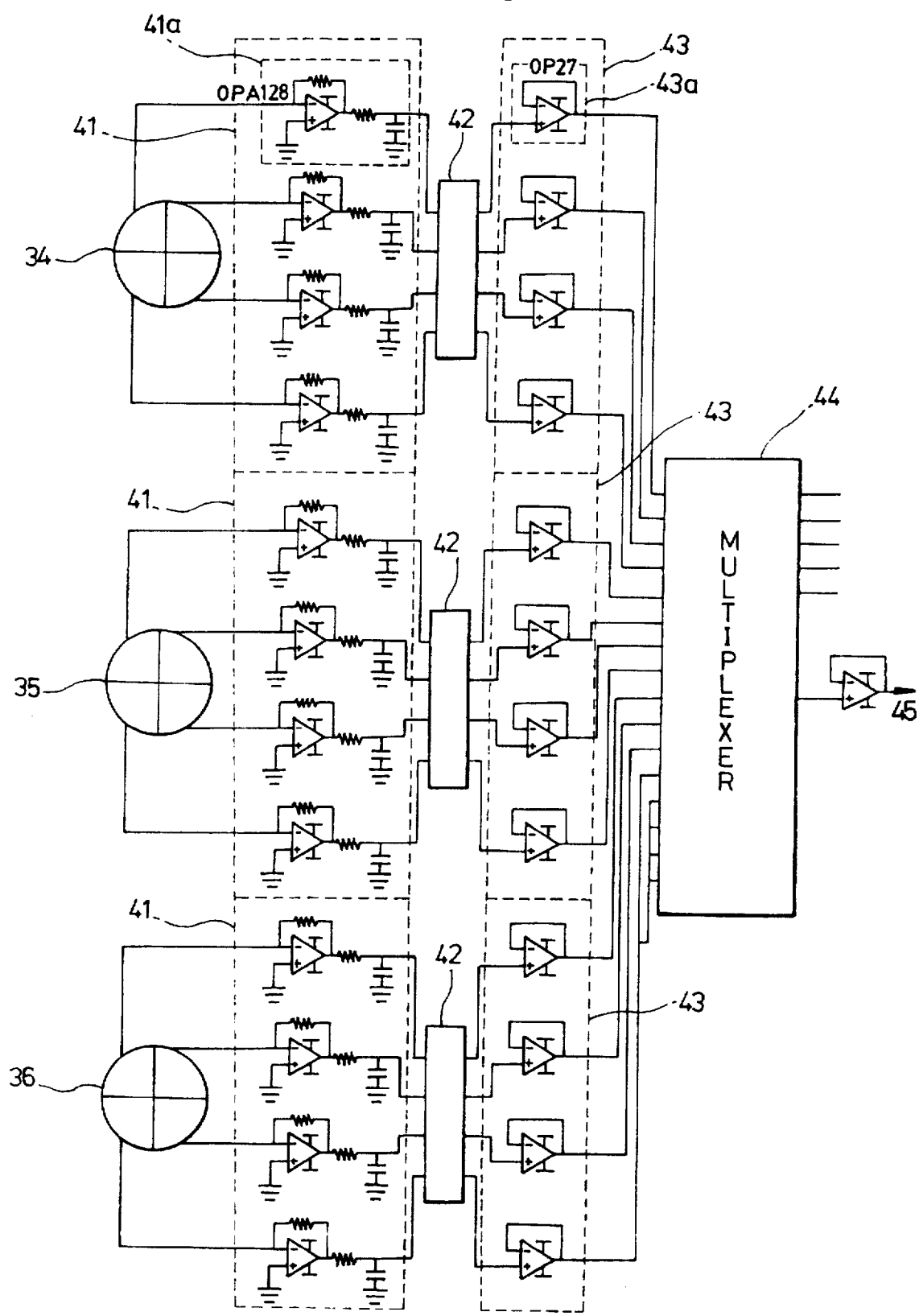
FIG. 6 is a circuit diagram illustrating a signal processing part of an apparatus according to the present invention.
Figure 7:
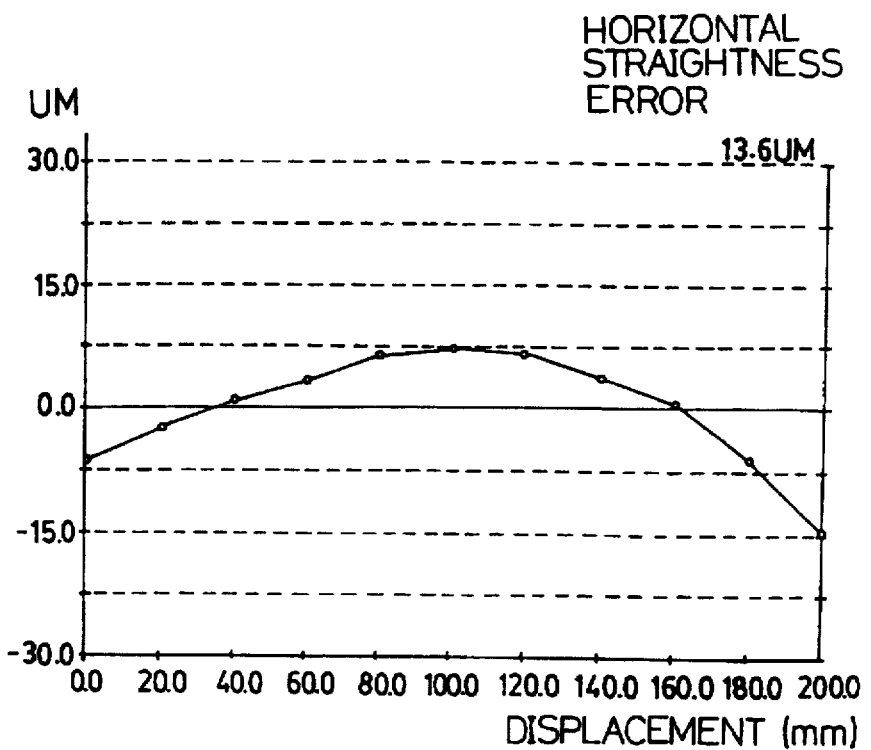
FIG. 7 illustrates a result of horizontal straightness errors measured by an apparatus according to the present invention.
Figure 8:
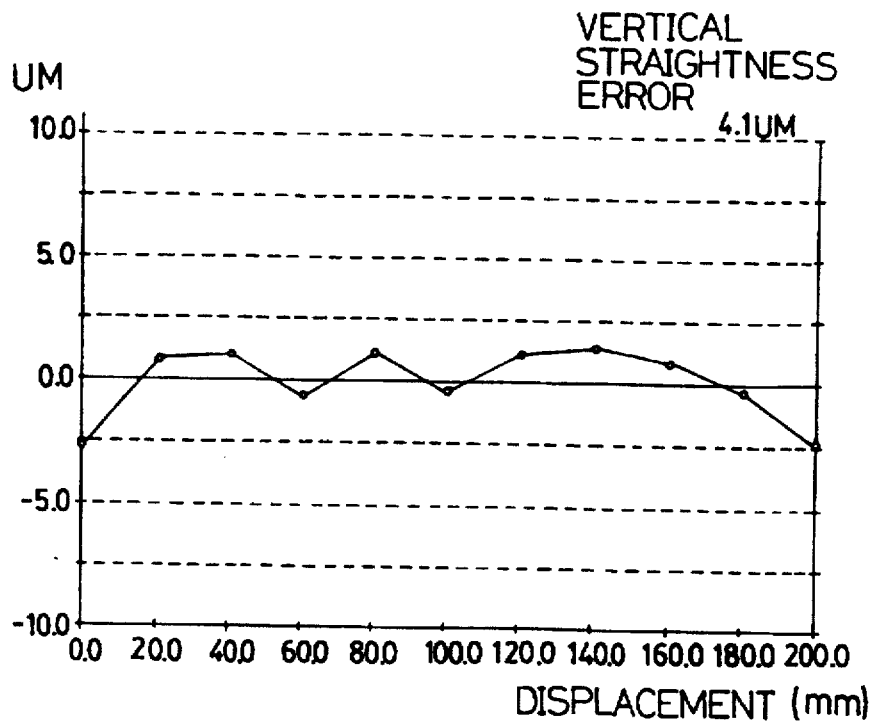
FIG. 8 illustrates a result of vertical straightness errors measured by an apparatus according to the present invention.
Figure 9:
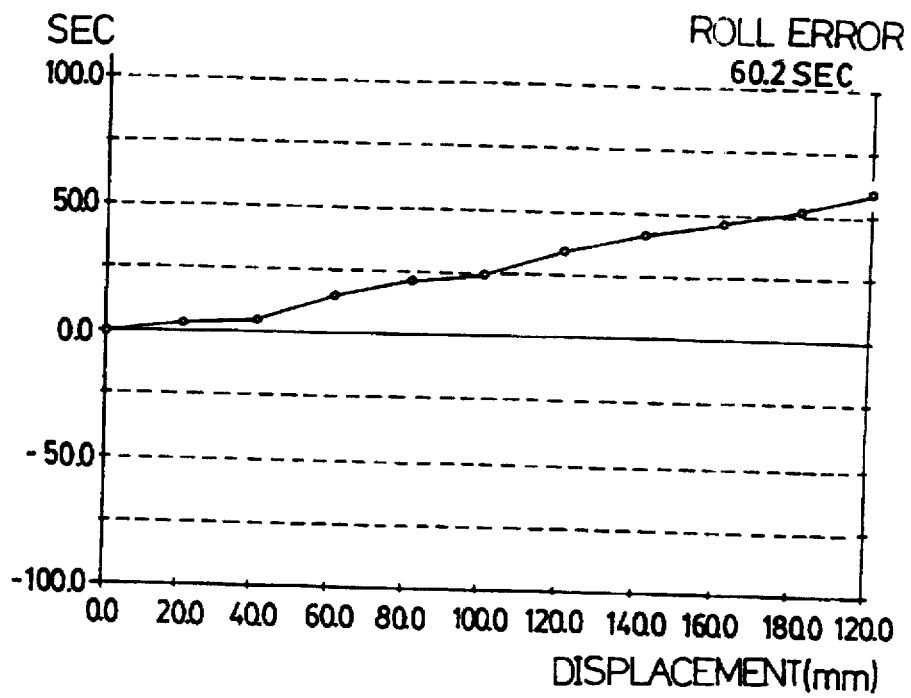
FIG. 9 illustrates a result of roll errors measured by an apparatus according to the present invention.
Figure 10:
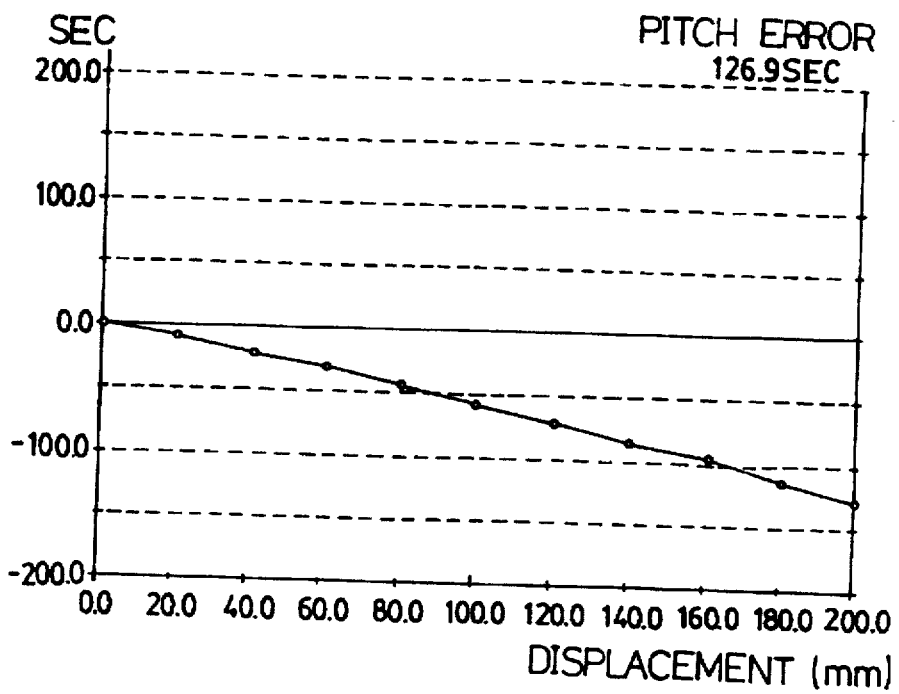
FIG. 10 illustrates a result of pitch errors measured by an apparatus according to the present invention.
Figure 11:
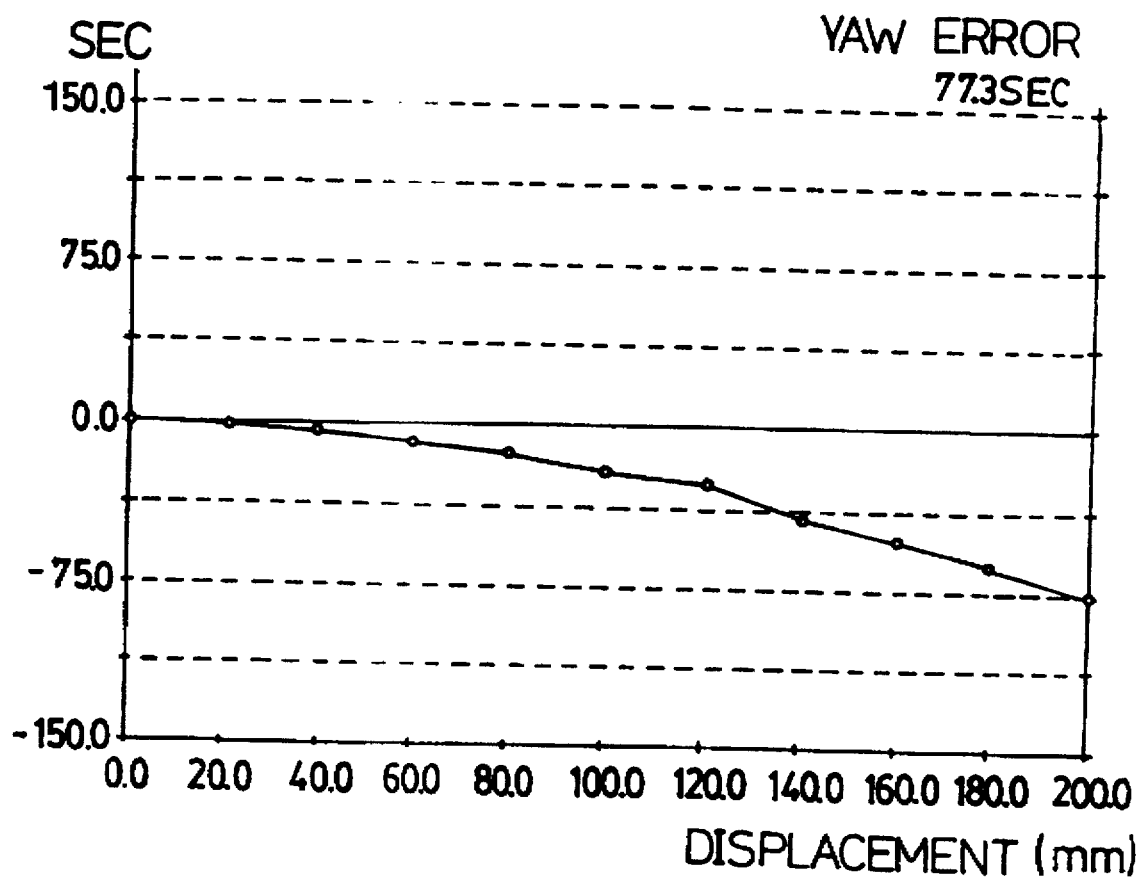
FIG. 11 illustrates a result of yaw errors measured by an apparatus according to the present invention.

Referring to FIG. 4 to FIG. 6, an apparatus according to the present invention comprises an optical part 30, a signal processing part 40, a computer cooperating part, and a driving part. The optical part 30 includes a laser 31 which emits beam B, a first beam splitter 32 and a second beam splitter 33 which split the beam into three branches $B_2$, $B_3$, and $B_4$ and a first photodetector 34, a second photodetector 35, and a third photodetector 36 which generate output signals in response to the three branches $B_2$, $B_3$, and $B_4$ of the beam B. The signal processing part 40 includes first amplifying circuits 41, connectors 42, second amplifying circuits 43, and a multiplexer 44 which amplify the output signals of the photodetectors 34, 35 and 36. The computer cooperating part includes a computer 46, an analog to digital converter 45 (hereinafter, referred to as "AD converter"), and a motor driver 47 which process and control input and output data. The driving part includes a stepping motor 48, a feed axis 49, and a feed table 50.

In more detail, as shown in FIG. 5A, the laser 31 which emits the beam B is arranged at a predetermined position as a light source. The first beam splitter 32 is latitudinally provided thereof in alignment with the laser 31 to directly receive the beam B from the laser 31. The second beam splitter 33 is longitudinally provided thereof in alignment with the first beam splitter 32 so that one branch $B_1$ splitted by the first beam splitter 32 is incident on the second beam splitter 33. Therefore, the beam B emitted from the laser 31 is splitted into three branches $B_2$, $B_3$ and $B_4$ through the first and second beam splitter 32, 33.

The photodetectors 34, 35, and 36 employ quadrant photodiodes in this embodiment as shown in FIG. 6. The first photodetector 34 and the second photodetector 35 are mounted within a housing 37. The third photodetector 36 is mounted within a housing 38. The housings 37, 38 are fixedly provided on a movable table 51. The housing 37 is latitudinally aligned with the first and second beam splitters 32, 33 so that another branch B2 of the first beam splitter 32 and one branch $B_3$ of the second beam splitter 33 are incident on each of the first photodetector 34 and the second photodetector 35. The housing 38 is longitudinally aligned with the second beam splitter 33 so that another branch $B_4$ of the second beam splitter 33 is incident on the third photodetector 36.

On the other hand, as another configuration, the optical part 30 may be arranged as shown in FIG. 5B. A first beam splitter 32' and a housing 37' are longitudinally provided. A second beam splitter 33' and a housing 38' are latitudinally provided. A first photodetector 34' and a second photodetector 35' are mounted within the housing 37'. A third photodetector 36' is mounted within the housing 38'. Further, the photodetectors 34', 35' and 36' according to the embodiment as described above employ quadrant photodiodes. On the other hand, the quadrant photodiodes may be replaced with bilateral photodiodes.

Now, referring to FIG. 6, the signal processing part 40 is shown in detail. The quadrant photodiodes 33, 34, 35 are connected to the first amplifying circuits 41, respectively. In more detail, each quadrant surface of the photodiodes 33, 34, 35 is connected to each amplifier 41a so that output current signals of the photodiodes 33, 34, 35 are converted to voltage signals corresponding to the current signals. The first amplifying circuits 41 are connected to the second amplifying circuits 43 via the connectors 42 so that each amplifier 41a is connected to each amplifier 43a. Accordingly, the converted voltage signals are amplified into measurable ranges. The second amplifying circuits 43 are connected to the AD converter 45 via the multiplexer 44.

Referring to FIG. 4, the AD converter 45 which is connected to the signal processing part 40 converts analog signals of the signal processing part 40 into corresponding digital signals. Further, the AD converter 45 is connected to the computer 46 to input the digital signals of the AD converter 45 into the computer 46. The computer 46 processes the input digital signals of the AD converter 45. The computer 46 is connected to the motor driver 47 which controls linear motion of the feed axis 49.

The feed axis 49 is threaded on the peripheral surface therealong and is coupled to the stepping motor 48. The stepping motor 48 is connected to the motor driver 47. Further, the feed axis 49 is fitted with feeding screws 49a which are fixed to the feed table 50. The movable table 51 is fixedly mounted on the feed table 50.

Operation and error measurement of the described and illustrated system will now be explained.

Again referring to FIG. 5A, the laser 31 emits beam B and the beam B is incident on the first beam splitter 32. The splitter 32 splits the beam B into two branches $B_1$ and $B_2$. One branch $B_1$ is incident on the second beam splitter 33 to split the branch $B_1$ into two branch $B_3$ and $B_4$. As a result, the beam B from the laser 31 is splitted into three branches $B_2$, $B_3$ and $B_4$ via the first beam splitter 32 and the second beam splitter 33. The branches $B_2$, $B_3$ and $B_4$ are incident on the first, second and third quadrant photodiodes 34, 35 and 36, respectively. Therefore, the photodiodes 34, 35 and 36 generate current signals corresponding to positional coordinates on which each branches $B_2$, $B_3$, $B_4$ is incident on each of the photodiodes 34, 35 and 36.

On the other hand, in another embodiment of the optical part 30 according to the present invention, referring to FIG. 5B, the beam B from the laser 31 is splitted into three branches $B_2$, $B_3$ and $B_4$ via the first beam splitter 32' and the second beam splitter 33'. The branches $B_2$, $B_3$ and $B_4$ are incident on the first, second, and third quadrant photodiodes 34', 35' and 36', respectively. Therefore, the photodiodes 34', 35' and 36' generate current signals corresponding to positional coordinates on which each of the branches $B_2$, $B_3$ and $B_4$ is incident on each of the photodiodes 34', 35' and 36'.

Now, referring to FIG. 6, the current signals of the quadrant photodiodes 34, 35, 36 are converted into measurable voltage signals by the signal processing part 40. First, the current signals of the photodiodes 34, 35, 36 are converted into the corresponding voltage signals by each of the first amplifying circuits 41 which has four amplifiers 41a. At this time, the magnitude of the resistors of the amplifiers 41a, which determine amplifying ratios, is selected in accordance with intensity of the laser beam B. Second, the voltage output signals of the first amplifying circuits 41 are amplified into the measurable voltage output signals by the second amplifying circuits 43. The amplified voltage signals of the second amplifying circuits 43 are applied to the AD converter 45 via the multiplexer 44. The converted digital signals by the AD converter 45 are inputted into the computer 46 in real time. The computer 46 actuates the motor driver 47 to drive the stepping motor 48 and control the feed axis 49. Therefore, the motion errors of the feed axis 49 are measured in real time.

Hereinafter, measurement principle of the embodiments as mentioned above and motion errors with five degrees of freedom thereof will be described in detail.

Now, it is assumed that the feed axis 49 moves in the z-axis direction in x-y-z coordinate system. Accordingly, $(X_1, Y_1)$ represents positional coordinates of a beam spot $P_1$ of the first photodiode 34, $(X_2,Y_2)$ represents positional coordinates of a beam spot $P_2$ of the second photodiode 35, and $(X_3, X_3)$ represents positional coordinates of a beam spot $p_3$ of the third photodiode 36. Displacement Z represents feeding distance of the feed axis 49. Each of motion errors with five degrees of freedom will be measured as follows.

Measurement of Horizontal Straightness Errors

The horizontal straightness errors $H_E$ denote translation errors in x-axis direction of the feed table 50 when the feed table 50 moves along the z-axis. The horizontal straightness errors are obtained from X coordinates of the first quadrant photodiode 34 according to the feed axis 49. Then, the horizontal straightness errors $H_E$ are deviations between X coordinates of first quadrant photodiode 34 and coordinates of a reference straight line. Therefore, the horizontal straightness errors $H_E$ are given by the following relation.

Horizontal straightness errors=Xcoordinates of first quadrant photodiode−coordinates of reference straight line Let the formula of the reference straight line be X=AZ+B, $$H_E = X - (AZ + B) \quad (1)$$

where the constants A and B are obtained by the least square method or the minimum zone method.

Measurement of Vertical Straightness Errors $V_E$

The vertical straightness errors denote translation errors in y-axis direction of the feed table 50 when the feed table 50 moves along the z-axis. The vertical straightness errors are obtained from Y coordinates of the first quadrant photodiode 34 according to the feed axis 49. Then, the vertical straightness errors $V_E$ are deviations between Y coordinates of first quadrant photodiode 34 and coordinates of a reference straight line. Therefore, the vertical straightness errors $V_E$ are given by the following relation.

Vertical straightness errors=Ycoordinates of first quadrant photodiode=coordinates of reference straight line Let the formula of the reference straight line be X=AZ+B, $$V_E = Y - (AZ + B) \quad (2)$$

Measurement of Roll errors $R_E$

The roll errors $R_E$ denote rotation errors of the feed table 50 about the z-axis when the feed table 50 moves along the z-axis. The roll errors $R_E$ are obtained from the relative differences between output coordinates $(X_1, Y_1)$ of first quadrant photodiode 34 and output coordinates $(X_2, Y_2)$ of second quadrant photodiode 35 according to the feed axis 49.

Let the distance between the first photodiode 34 and the second photodiode 35 as shown in FIG. 5A be $L_1$ and let the vertical parallelism error of the first beam splitter 32 be $\theta_R$, the roll errors $R_E$ are given as follows.

$$R_E = (Y_1 - Y_2 - \theta_R \cdot Z)/L_1 \quad (3)$$

Here, considering the parallelism error of the first beam splitter 32, the roll errors $R_E$ can be precisely measured.

Measurement of Pitch errors $P_E$

The pitch errors $P_E$ denote rotation errors of the feed table 50 about the x-axis when the feed table 50 moves along the z-axis. The pitch errors $P_E$ are obtained from the differences between output coordinates $Y_2$ of the second photodiode 35 and output coordinate $X_3$ of the third photodiode 36.

Let the distance between the second photodiode 35 and the third photodiode 36 as shown in FIG. 5A be $L_2$, and let the vertical parallelism error of the second beam splitter 33 be $\theta_P$, the pitch errors $P_E$ are given as follows.

$$P_E = (Y_3 - Y_2 - \theta_P \cdot Z)/L_2 \quad (4)$$

Considering the parallelism error of the second beam splitter 33, the pitch error $P_E$ can be precisely measured.

Measurement of Yaw Error $Y_E$

The yaw errors $Y_E$ denote rotation errors of the feed table 50 about the y-axis when the feed table 50 moves along the z-axis. The yaw errors $Y_E$ are obtained from the differences between output coordinates $X_2$ of the second photodiode 35 and output coordinates $X_3$ of the third photodiode 36.

Let the distance between the second photodiode 35 and the third photodiode 36 be $L_2$, let the distance between the first photodiode 34 and second third photodiode 35 be $L_1$, and let the horizontal parallelism error of the second beam splitter 33 be $\theta_Y$, the yaw errors $Y_E$ are given as follows.

$$Y_E = (X_2 - X_3 + L_1 \cdot R_E - \theta_Y \cdot Z)/L_2$$

Considering the parallelism error of the second beam splitter 33 and the roll error of the feed axis 49, the yaw error $Y_E$ can be precisely measured.

For reference, FIG. 7 to FIG. 11 illustrates results of five motion errors measured by an apparatus according to the present invention.

From the above description, it will be apparent that the present invention has the following effects.

First, five important parametric errors, which are not measurable or measured in part in the prior arts, can be simultaneously measured with just one setup.

Second, considering the parallelism error of the optical components, for example, the first and the second beam splitters, rotation errors are very precisely measured.

Third, since computer aided on line measurement techniques are proposed using photosensors, the whole measurement tasks are performed in very short time and in real time.

The invention is in no way limited to the embodiments described hereinabove. Various modifications of disclosed embodiments as well as other embodiments of the invention will become apparent to persons skilled in the art upon reference to the description of the invention. It is therefore contemplated that the appended claims will cover any such modification or embodiments as fall within the true scope of the invention.

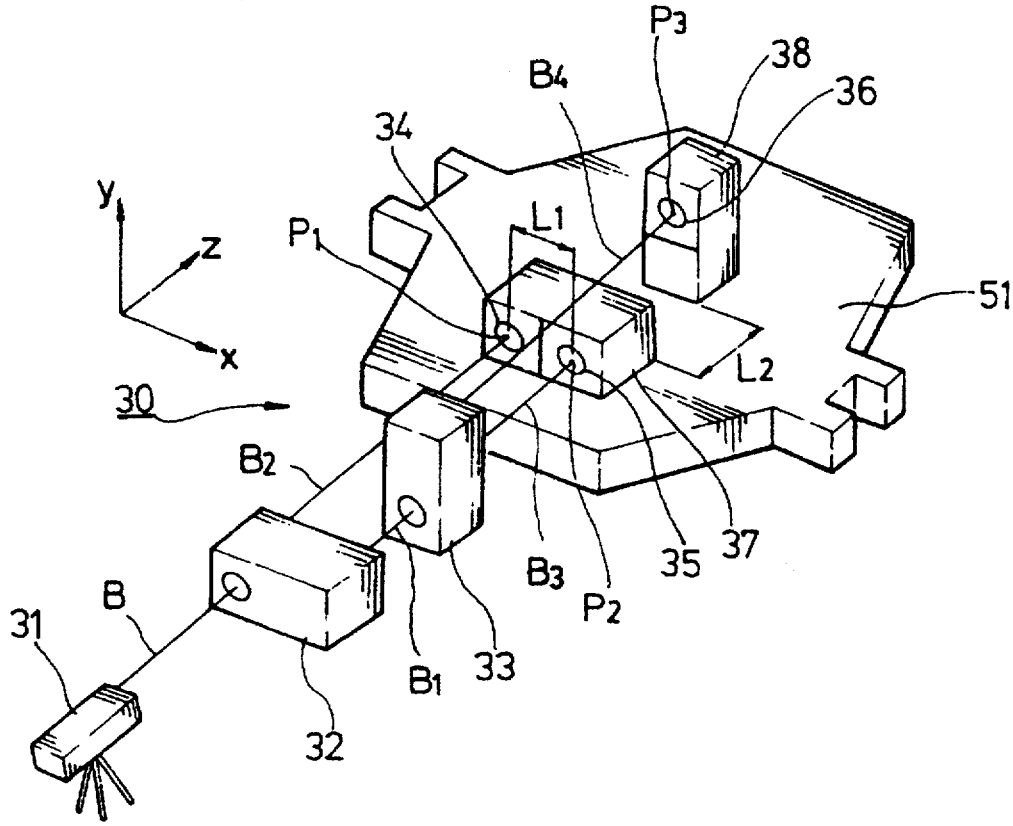

What is claimed is:

1. An apparatus for measuring motion errors of five degrees of freedom along a guideway comprising:

a light source arranged at a fixed position for continuously emitting a light beam in one fixed emitting direction;

means fixedly located in front of said light source for splitting the beam into three branches, said splitting means having a first beam splitter and a second beam splitter provided in front of the first beam splitter, wherein the first beam splitter directly receives the beam from said light source and the second beam splitter receives one of said branches from the first beam splitter and wherein the three branches are parallel to one another with parallelism errors of the beam splitters themselves;

photosensing means, positioned to continuously receive three branches split by the first beam splitter and second beam splitter, for sensing positional coordinates of the three branches which are incident thereon, said photosensing means having first, second and third photodetectors which are fixedly mounted on a movable table having a fixed moving direction of one degree of freedom with no motion error in the moving direction itself parallel to the emitting direction of the beam and having other motion errors of five degrees of freedom, wherein the first and second photodetectors are provided at equal distances from said light source in the emitting direction of said light source and the third photodetector is spaced apart at a sufficiently long distance from the first and second photodetectors to have good resolution, and wherein each of the first, second and third photodetectors respectively senses the positional coordinate of the three branches;

a signal processor connected to said photosensing means to process output signals of said photosensing means;

a converter connected to said signal processor to convert analog signals of said processor to digital signals;

a computer connected into said converter to calculate the motion errors of five degrees of freedom along the guideway with the inputted positional coordinates of the three branches and parallelism errors of the beam splitters;

driving means controllably connected to said computer for generating driving forces; and feeding means connected to said driving means for linearly feeding the movable table.

2. An apparatus as claimed in claim 1, wherein said signal processor comprises first amplifying circuits for converting output currents of said photosensing means into corresponding voltages, second amplifying circuits connected to the first amplifying circuits via connectors for amplifying the voltages within measurable ranges, and a multiplexer for receiving output voltages amplified by the second amplifying circuits.

3. An apparatus as claimed in claim 1, wherein the first beam splitter is latitudinally provided thereof in alignment with said light source, and the second beam splitter is longitudinally provided thereof in alignment with the first beam splitter wherein the first and the second photodetectors are mounted within first housing which is latitudinally provided thereof in alignment with the first beam splitter so that one branch of the first beam splitter is incident on the first photodetector, and the third photodetector is mounted within second housing which is longitudinally provided thereof in alignment with the second beam splitter so that one branch of the second beam splitter is incident on the third photodetector.

4. An apparatus as claimed in claim 1, wherein the first beam splitter is longitudinally provided thereof in alignment with said light source, and the second beam splitter is latitudinally provided thereof in alignment with the first beam splitter wherein the first and the second photodetectors are mounted within first housing which is longitudinally provided thereof in alignment with the first beam splitter so that one branch of the first beam splitter is incident on the first photodetector, and the third photodetector is mounted within second housing which is latitudinally provided thereof in alignment with the second beam splitter so that one branch of the second beam splitter is incident on the third photodetector.

5. An apparatus as claimed in claim 1, wherein said driving means comprises a motor driver operatively connected to said computer, and a motor driven by signals of the motor driver.

6. An apparatus as claimed in claim 5, wherein said feeding means comprises a feed axis which is coupled to the motor and is fitted with feed screws, and a feed table which is fixed to the feed screws and on which the moving table is fixedly mounted.

* * * * *

UNITED STATES PATENT AND TRADEMARK OFFICE
CERTIFICATE OF CORRECTION

PATENT NO.    : 5,698,843  
DATED         : Dec. 16, 1997  
INVENTOR(S)   : Heui Jae Pahk Page 1 of 2

It is certified that error appears in the above-identified patent and that said Letters Patent is hereby corrected as shown below:

The title page should be deleted to appear as per attached title page.

Signed and Sealed this

Thirtieth Day of June, 1998

*Attest:*

BRUCE LEHMAN

*Attesting Officer*    Commissioner of Patents and Trademarks

United States Patent [19]

Pahk

[11] Patent Number: 5,698,843
[45] Date of Patent: Dec. 16, 1997

[54] APPARATUS FOR MEASURING MOTION ERRORS OF FIVE DEGREES OF FREEDOM ALONG GUIDEWAY

[76] Inventors: Heui Jae Pahk, Na-404, Kyosu Apt., 244-2, Bongchun-dong, Kwanak-ku, Seoul, Rep. of Korea

[21] Appl. No.: 527,678

[22] Filed: Sep. 12, 1995

[51] Int. Cl.$^6$ .................................................. H01J 40/14
[52] U.S. Cl. ............................ 250/206.2; 250/559.29
[58] Field of Search ............................ 250/206.2, 548, 250/559.3, 559.29; 356/375

[56] References Cited

U.S. PATENT DOCUMENTS

| | | | |
|---|---|---|---|
| 4,707,597 | 11/1987 | Schulz-Hennig et al. | 250/206.2 |
| 4,880,308 | 11/1989 | Shirasu | 250/548 |
| 5,345,087 | 9/1994 | Luber et al. | 250/559.29 |
| 5,457,310 | 10/1995 | Fournier | 250/206.2 |

OTHER PUBLICATIONS

Draft Standard, Methods for Performance Evaluation of Computer Numerically Controlled Machining Centers, ANSI/ASME B5. 54–1991, p. 101, 1991.

Manfred Weck, Handbook of Machine Tools, Metrological Analysis and Performance Tests, vol. 4, 1994, p. 32, translated by H. Bibring.

*Primary Examiner*—Edward P. Westin
*Assistant Examiner*—Kevin Pyo
*Attorney, Agent, or Firm*—Lowe, Price, LeBlanc & Becker

[57] ABSTRACT

A computer aided error measurement system is disclosed. The horizontal and vertical straightness errors as well as roll, pitch and yaw errors are measured simultaneously with just one setup according to the system. The system includes a computer and related components thereof. The system also includes a light source, two beam splitters, and three photodetectors. The output signals are inputted into the computer via amplifying circuits and an analog to digital converter. The computer actuates a motor driver to drive a stepping motor and controls a feed axis with the motion errors. The whole measurement takes are performed in very short time and in real time.

6 Claims, 7 Drawing Sheets